United States Patent
Ogiso et al.

(10) Patent No.: US 7,356,316 B2
(45) Date of Patent: Apr. 8, 2008

(54) WIRELESS COMMUNICATION SYSTEM

(75) Inventors: Takayuki Ogiso, Tokyo (JP); Kunio Fukuda, Tokyo (JP)

(73) Assignee: Sony Corporation (JP)

( * ) Notice: Subject to any disclaimer, the term of this patent is extended or adjusted under 35 U.S.C. 154(b) by 223 days.

(21) Appl. No.: 10/550,234

(22) PCT Filed: Mar. 5, 2004

(86) PCT No.: PCT/JP2004/002898

§ 371 (c)(1),
(2), (4) Date: Sep. 22, 2005

(87) PCT Pub. No.: WO2004/086682

PCT Pub. Date: Oct. 7, 2004

(65) Prior Publication Data

US 2006/0072614 A1   Apr. 6, 2006

(30) Foreign Application Priority Data

Mar. 26, 2003  (JP)  .............................. 2003-086160

(51) Int. Cl.
*H04B 1/04*   (2006.01)
*H04Q 11/12*   (2006.01)
(52) U.S. Cl. .............................. 455/127.5; 455/343.1; 370/311
(58) Field of Classification Search ............. 455/127.5, 455/343.1–5; 370/311
See application file for complete search history.

(56) References Cited

U.S. PATENT DOCUMENTS

| | | | |
|---|---|---|---|
| 4,701,909 A * | 10/1987 | Kavehrad et al. ............ 370/446 |
| 5,559,804 A | 9/1996 | Amada et al. | |
| 5,740,517 A * | 4/1998 | Aoshima ................... 340/7.34 |
| 5,805,990 A | 9/1998 | Ohki | |
| 7,020,102 B2 * | 3/2006 | Tuomainen et al. ........ 370/311 |
| 2004/0190467 A1 * | 9/2004 | Liu et al. .................... 370/311 |

FOREIGN PATENT DOCUMENTS

| | | |
|---|---|---|
| JP | 6-311160 A | 11/1994 |
| JP | 8-181702 A | 7/1996 |
| JP | 2000-261462 A | 9/2000 |
| JP | 2002-198974 A | 7/2002 |

\* cited by examiner

*Primary Examiner*—Edward F. Urban
*Assistant Examiner*—Christian A. Hannon
(74) *Attorney, Agent, or Firm*—Lerner, David, Littenberg, Krumholz & Mentlik, LLP

(57) ABSTRACT

A sleep length calculation unit 410 of a terminal calculates a sleep length based on what is contained in a PLCP header of a frame, and sets the calculated length on a timer 430. An address detection unit 420 of the terminal detects a destination address from inside a MAC header of the frame to see if this frame is destined for another terminal. If the frame is found destined for another terminal, then this terminal gives a power supply unit 180 an instruction to start sleeping while causing the timer 430 to start counting time. When the sleep length is found to have elapsed on the timer 430, the terminal gives the power supply unit 180 an instruction to stop sleeping. If what is contained in the PLCP header or MAC header is not deemed reliable, then a sleep inhibit determination unit 440 inhibits the power supply unit 180 from going to sleep. The structure allows a wireless communication system to effect a transition into power-saving mode upon acquiring necessary information, without making changes to existing standards.

2 Claims, 16 Drawing Sheets

FIG.6

| SIGNAL 836 | TRANSMISSION RATE 8361 |
|---|---|
| 0x0A (0b00001010) | 1Mbit/s |
| 0x14 (0b00010100) | 2Mbits/s |
| 0x37 (0b00110111) | 5.5Mbits/s |
| 0x6E (0b01101110) | 11Mbits/s |

FIG.10

| DATA RATE | MODULATION METHOD | CODING RATE | TRANSMISSION RATE |
|---|---|---|---|
| 0b1101 | BPSK | 1/2 | 6Mbits/s |
| 0b1111 | BPSK | 3/4 | 9Mbits/s |
| 0b0101 | QPSK | 1/2 | 12Mbits/s |
| 0b0111 | QPSK | 3/4 | 18Mbits/s |
| 0b1001 | 16QAM | 1/2 | 24Mbits/s |
| 0b1011 | 16QAM | 3/4 | 36Mbits/s |
| 0b0001 | 64QAM | 2/3 | 48Mbits/s |
| 0b0011 | 64QAM | 3/4 | 54Mbits/s |

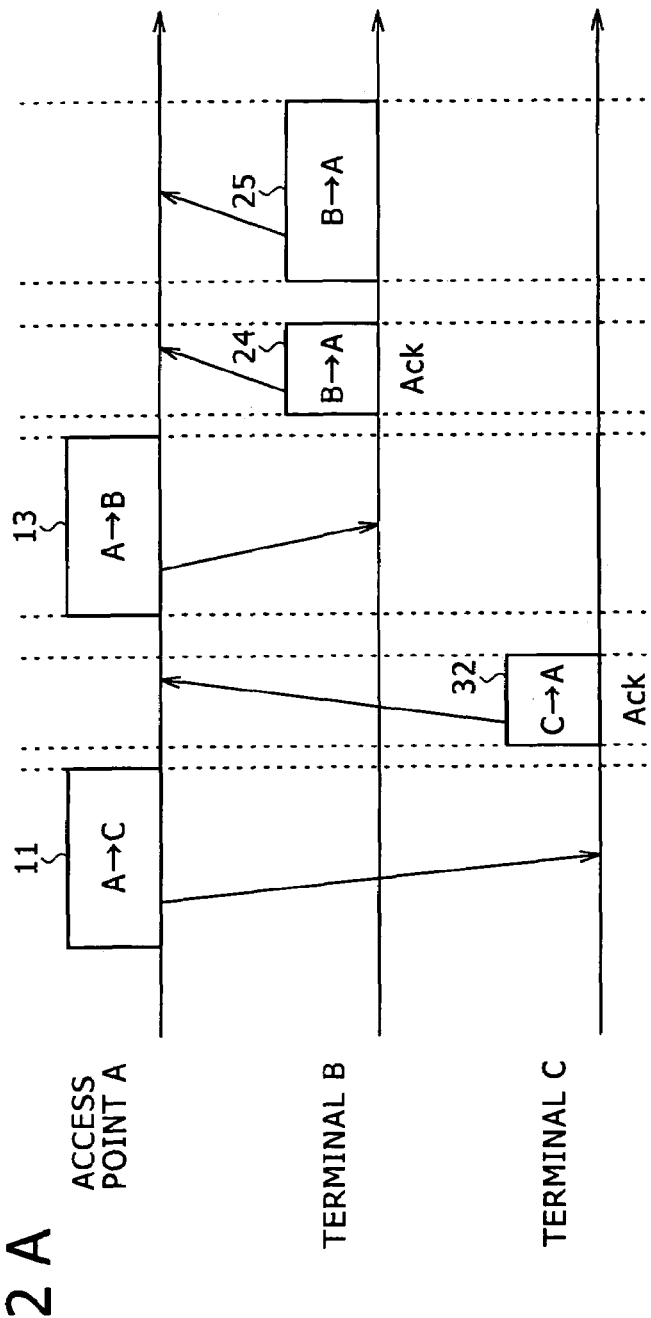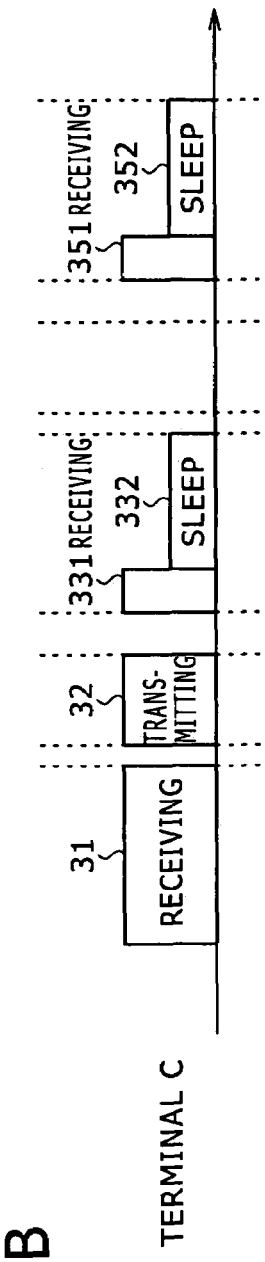

WIRELESS COMMUNICATION SYSTEM

TECHNICAL FIELD

The present invention relates to a wireless communication system. More particularly, the invention relates to a wireless communication system with terminals arranged to operate in power-saving fashion, a processing method for use with these terminals, a program for causing a computer to carry out that processing method, and a storage medium which stores that program in a computer-readable manner.

BACKGROUND ART

Wireless communication systems are each made up of component terminals communicating with one another wirelessly. One such system is the wireless LAN (local area network) gaining widespread use by replacing conventional wired LANs. There exist a number of standards for the wireless LAN. The IEEE 802.11 standard stipulated by a working group under the IEEE (Institute of Electrical and Electronics Engineers) 802 standardization committee is known in particular for its provisions regarding the physical layer and a MAC (medium access control) sublayer (data link layer), the upper layer closest to the physical layer.

With respect to the usage of the medium characterized as "wireless", the IEEE 802.11 standard divides the physical layer into two sublayers: a PMD (physical layer dependent) sublayer and a PLCP (physical layer convergence protocol) sublayer. Depending on the properties of the medium, the PMD sublayer stipulates a plurality of transmission systems including the frequency hopping system, direct-sequence spread-spectrum system, and infrared intensity modulation system. The PLCP sublayer constitutes a protocol for communicating physical layer information. Under the protocol, a PLCP header is provided to retain such information as the modulation method in use, transmission rate, and data length.

The data link layer that exists above the physical layer is composed of the MAC sublayer and an LLC (logical link control) sublayer. The IEEE 802.11 standard covers the layers up to the MAC sublayer, the upper layer closest to the physical layer. The MAC sublayer stipulates control over access to the medium, with a MAC header arranged to hold such information as a medium use reserved time and a device address. A MAC frame under the MAC sublayer is encapsulated into a PLCP frame under the PLCP sublayer before being transmitted.

In the above wireless communication system, each of the configured wireless terminals works on batteries and is expected to operate in less power-consuming fashion than before. In fact, in a wireless LAN setup, terminals tend to consume more power because communications take place whenever data sent from an access point or any one terminal is received by each terminal. A technique has thus been proposed to ease that tendency toward higher power dissipation. The technique involves having each terminal check the destination address of any received packet (frame) to determine if the packet is destined for this terminal. If the packet is not found addressed to the terminal, then the terminal is arranged to halt the subsequent receiving procedure. For example, an error detection code for use in a header of a layer higher than the physical layer is prepared and attached to each packet. Upon receipt, the code-carrying header is checked by the terminal for any error. If no error is detected, the destination address and a packet duration time held in the header are used by the terminal for transition into power-saving mode (e.g., see Japanese Patent Laid-open No. 2000-261462, FIG. 1).

DISCLOSURE OF INVENTION

According to the related art discussed above, the frame structure stipulated by the IEEE 802.11 standard is expanded to accommodate the error detection code. The idea is to make a quick use of the destination address and packet duration time in the upper layer header. However, adopting expansions of the standard requires both the transmitting and the receiving sides to take extra measures to comply with the added expansions.

Illustratively, each access point needs to be modified so as to generate an error detection code and add the generated code to each upper layer header. Each wireless terminal needs to be modified in order to check the error detection code added to the received upper layer header.

It is therefore an object of this invention to provide a wireless communication system capable of making the transition into power-saving mode upon acquiring necessary information, with no changes made to the existing standard.

BRIEF DESCRIPTION OF DRAWINGS

FIG. 6 is a tabular view showing how values of a signal field 836 are related to values of a transmission rate field 8361 under the IEEE 802.11b standard;

FIG. 10 is a tabular view showing specific values of a data rate 844 under the IEEE 802.11a standard;

FIGS. 12A and 12B are timing charts showing how transmission sequences are related to the transmitting and receiving operations of wireless terminals in a wireless communication system;

BEST MODE FOR CARRYING OUT THE INVENTION

Preferred embodiments of this invention will now be described in detail with reference to the accompanying drawings.

Figure 1:
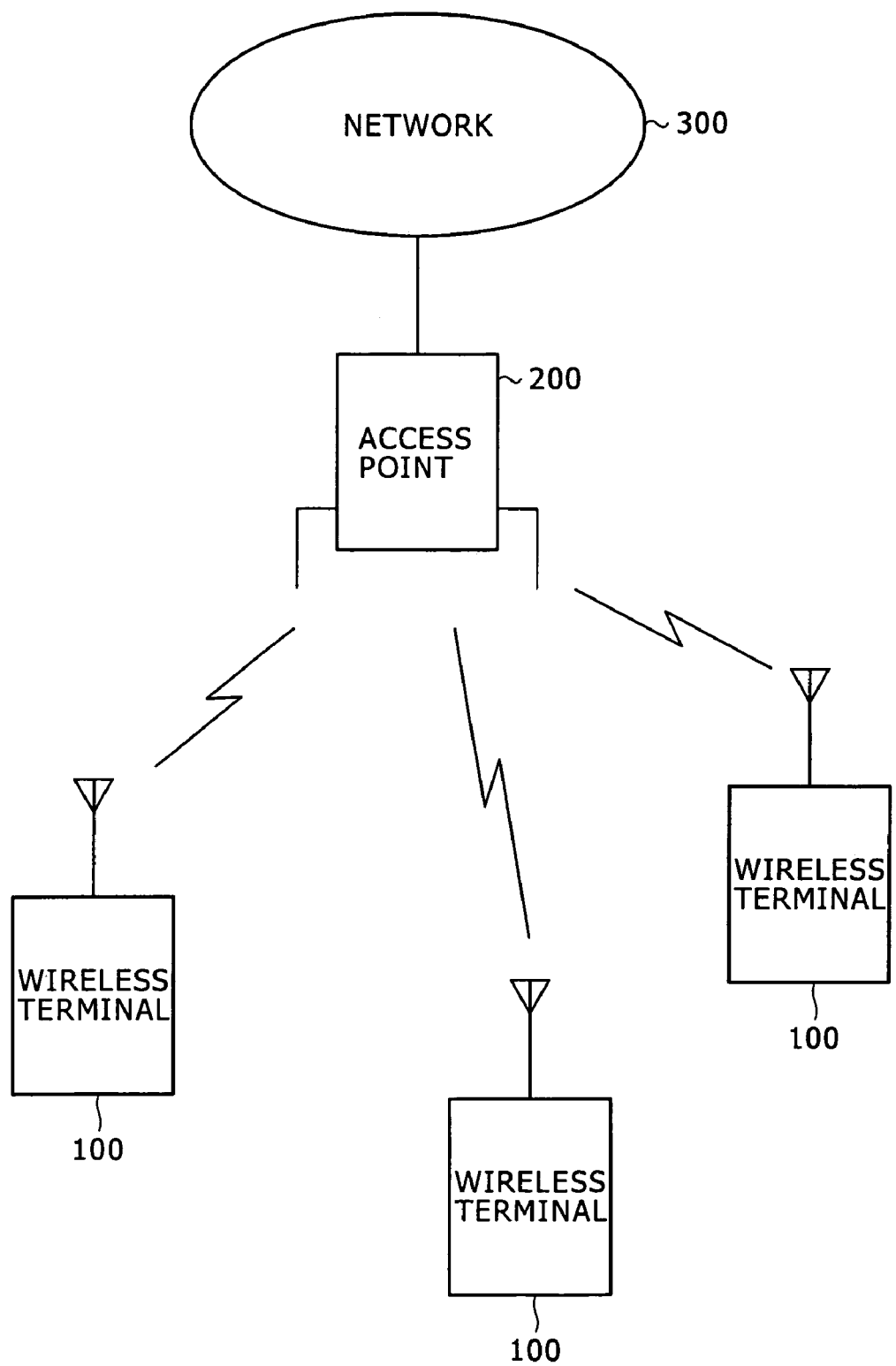
FIG. 1 is a schematic view showing a typical configuration of a wireless communication system embodying this invention.

FIG. 1 is a schematic view showing a typical configuration of a wireless communication system embodying this invention. In this example, an access point 200 is wired to a network 300, and a plurality of wireless terminals 100 are connected wirelessly to the access point 200. The access point 200 and wireless terminals 100 constitute a wireless LAN that is distinct from the network 300. The setup in which a network is formed by an access point is called an infrastructure mode.

Although the example of FIG. 1 shows only one wireless LAN, a plurality of access points 200 may be connected to the network 300 in practice. In such a case, a wireless terminal 100 as part of a first wireless LAN may communicate with another wireless terminal 100 belonging to a second wireless LAN by way of the access point 200 of the first LAN, via the network 300, and through the access point of the second LAN linked to the network 300.

There also exists a so-called ad-hoc mode in which terminals directly communicate with one another on a wireless LAN without the intervention of an access point. While this invention applies to any of these communication setups, the embodiments to be described hereunder are assumed to operate in the infrastructure mode.

Figure 2:
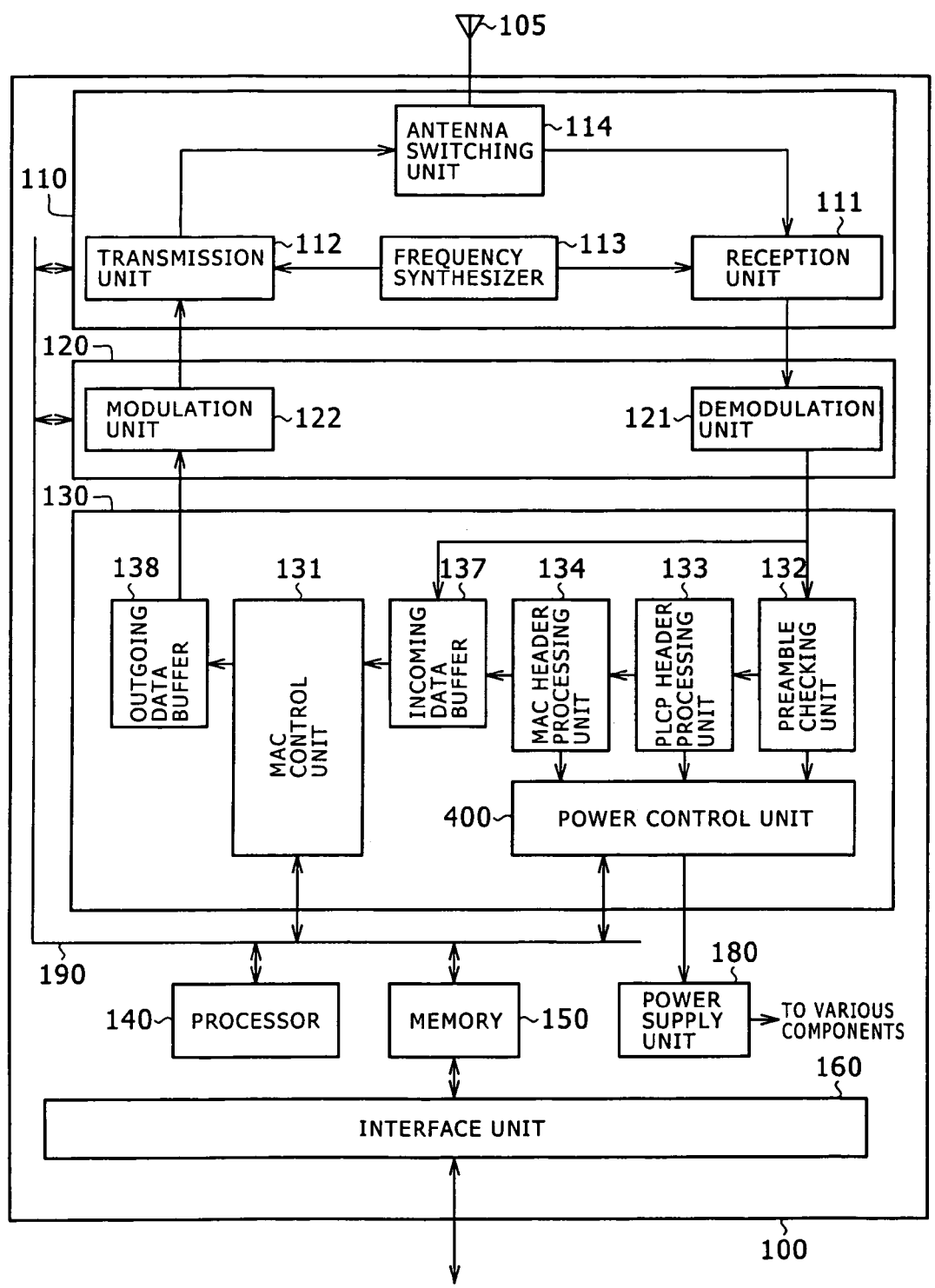
FIG. 2 is a block diagram showing a typical structure of a wireless terminal 100 embodying this invention.

FIG. 2 is a block diagram showing a typical structure of the wireless terminal 100 embodying this invention. The wireless terminal 100 is made up of a wireless communication unit 110, a modem unit 120, a MAC processing unit 130, a processor 140, and a memory 150, all interconnected by a buss 190. An interface unit 160 is connected to the memory 150. The wireless terminal 100 also has a power supply unit 180 that supplies power over power lines (not shown) to various components inside the wireless terminal 100.

The wireless communication unit 110 is designed to communicate wirelessly with an entity outside the wireless terminal. As such, the wireless communication unit 110 includes a reception unit 111 that receives wireless signals, a transmission unit 112 that transmits wireless signals, a frequency synthesizer 113 that generates a frequency signal by which to send and receive wireless signals, and an antenna switching unit 114 which, interposed between the reception unit 111 and transmission unit 112, switches antenna settings. The frequency synthesizer 113 is typically composed of a PLL circuit (phase-locked loop circuit). An antenna 105 is connected to the frequency synthesizer 113.

The modem unit 120 provides conversion between outgoing and incoming signals for the wireless communication unit 110 on the one hand, and digital signals inside the wireless terminal on the other hand. The modem unit 120 is made up of a demodulation unit 121 that demodulates signals coming from the reception unit 111, and a modulation unit 122 that modulates outgoing signals and feeds the modulated signals to the transmission unit 112. For this wireless LAN, modulation is implemented in two categories: primary modulation and secondary modulation. The primary modulation refers illustratively to ASK (amplitude shift keying), FSK (frequency shift keying), PSK (phase shift keying), QAM (quadrature amplitude modulation), and CCK (complementary code keying). The secondary modulation covers the frequency-hopping spread-spectrum (FHSS) technology, direct-sequence spread-spectrum (DSSS) technology, and orthogonal frequency division multiplexing (OFDM), among others.

The MAC processing unit 130 includes a MAC control unit 131 that performs processes under the MAC sublayer, an incoming data buffer 137 that holds signals coming from the demodulation unit 121, and an outgoing data buffer 138 that holds signals destined for the modulation unit 122. The MAC processing unit 130 also has a preamble checking unit 132 that checks the preamble of signals from the demodulation unit 121, a PLCP header processing unit 133 that processes PLCP headers, a MAC header processing unit 134 that processes MAC headers, and a power control unit 400 that controls the power supply unit 180 in a manner reflecting the outputs from these components. The MAC control unit 131 and power control unit 400 are connected to the bus 190.

The processor 140 provides overall control of the wireless terminal 100. The memory 150 offers a work area in which the processor 140 carries out its processes. The interface unit 160 interfaces the wireless terminal 100 to another computer or to other portable apparatus. Any of these external apparatuses may be connected to the wireless terminal 100 physically from outside thereof. Alternatively, the wireless terminal 100 may be incorporated in one of the other apparatuses.

In supplying power to the components, the power supply unit 180 provides two modes: power-saving mode in which energy-efficient operations are carried out, and normal mode in which operations are normally performed. Operating in power-saving mode is popularly known as "sleep". The power control unit 400 implements diverse kinds of power-related control: starting and stopping sleep operations, and inhibiting the terminal from going to sleep.

Figure 3:
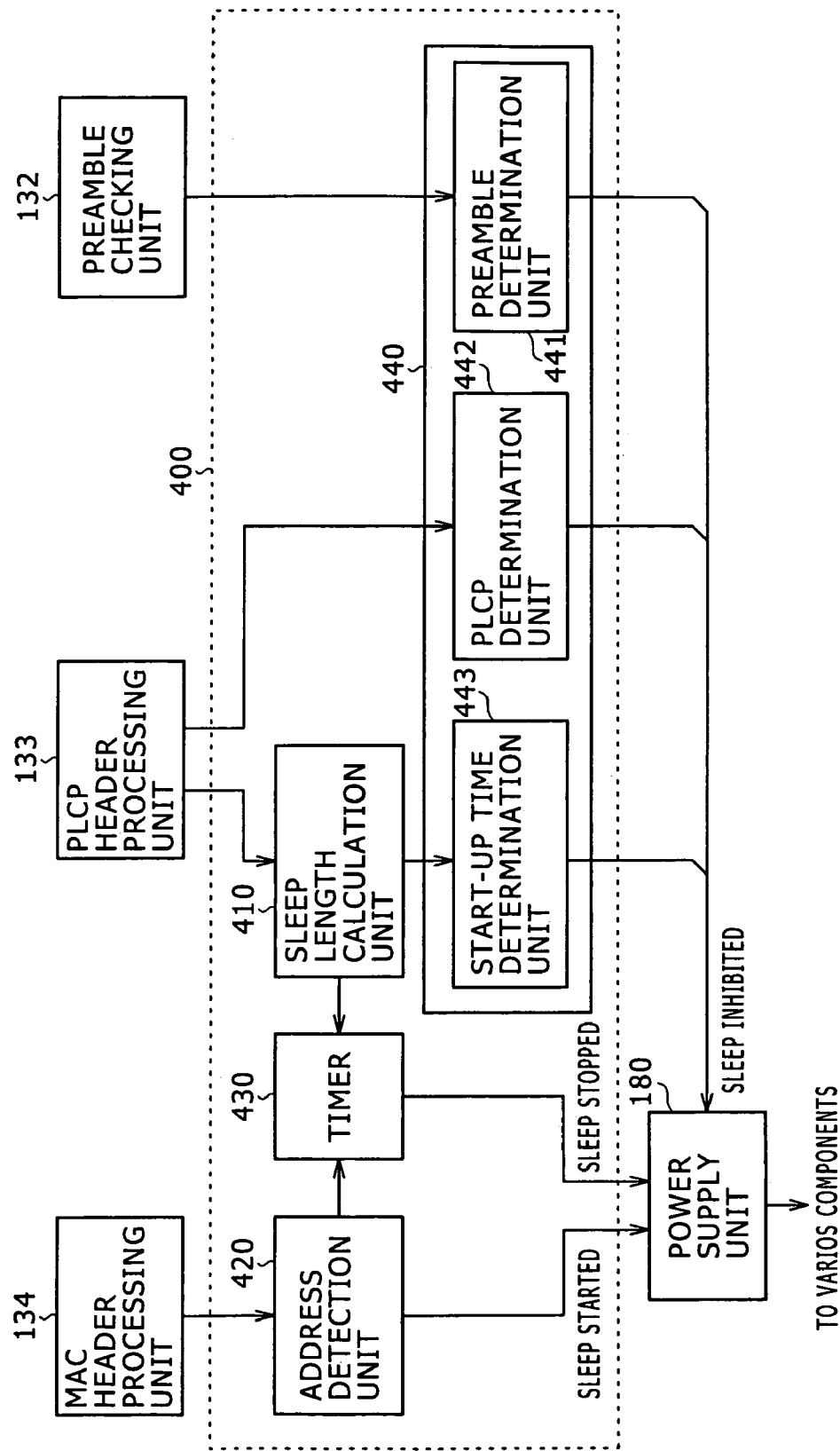
FIG. 3 is a block diagram showing a typical structure of a power control unit 400 embodying this invention.

FIG. 3 is a block diagram showing a typical structure of the power control unit 400 embodying this invention. The power control unit 400 has a sleep length calculation unit 410 that calculates the length of sleep, an address detection unit 420 that detects the destination address of a frame, a timer 430 that counts time on the sleep length, and a sleep inhibit determination unit 440 that inhibits the terminal from getting into the sleep state.

The sleep length calculation unit 410 calculates the length of sleep based on the PLCP header of a PLCP frame coming from the PLCP header processing unit 133, and sets the calculated sleep length on the timer 430. The address detection unit 420 detects the destination address in the MAC header of a MAC frame supplied by the MAC header processing unit 134. If the detected destination address turns out to be the address of another terminal, then the address detection unit 420 instructs the power supply unit 180 to start going to sleep. Upon giving the instruction for getting into the sleep state, the address detection unit 420 simultaneously causes the timer 430 to start counting time on the sleep length set thereon. In response, the timer 430 starts counting on the sleep length set by the sleep length calculation unit 410. Upon elapse of the sleep length, the sleep length calculation unit 410 instructs the power supply unit 180 to cancel the sleep state.

The sleep inhibit determination unit 440 instructs the power supply unit 180 not to get into power-saving mode, i.e., not to go to sleep. The sleep inhibit determination unit 440 includes a preamble determination unit 441 that checks information for data error detection coming from the preamble checking unit 132, a PLCP determination unit 442 that checks the data error detection information and PLCP content supplied from the PLCP header processing unit 133, and a start-up time determination unit 443 that checks the start-up times of the components in the wireless terminal 100 on the basis of the sleep length fed from the sleep length calculation unit 410.

Given data error detection information from the preamble checking unit 132, the preamble determination unit 441 inhibits the power supply unit 180 from getting into the sleep state if data errors are detected in excess of a predetermined threshold count. Too many errors in the preamble may be an indication of a worsened quality of the transmission channel in use. In that case, the PLCP header by which to determine the sleep length may contain an error. This requires maintaining normal mode in order to receive reliably the data that could be lost if received in power-saving mode under an inappropriate condition.

The PLCP determination unit 442 detects an error in the PLCP header based on information coming from the PLCP header processing unit 133. If such an error is detected, the PLCP determination unit 442 inhibits the power supply unit 180 from going to sleep. For example, error detection is performed using HEC (header error control) under the IEEE 802.11b standard. Under the IEEE 802.11a standard, parity-based error detection is carried out following the decoding of a convolutional code.

Besides performing the HEC— or parity-based error detection above, the PLCP determination unit 442 checks to determine whether any values in the fields of the PLCP header are logically incorrect. A predetermined value is defined for each of the fields, and none of the fields should contain an undefined value. If an undefined value is detected in any field, an error is assumed and the sleep state is inhibited accordingly.

Given the length of sleep from the sleep length calculation unit 410, the start-up time determination unit 443 compares the sleep length with the start-up times of the components in the wireless terminal 100. If the length of sleep is found shorter than any of the start-up times, then the start-up time determination unit 443 inhibits the power supply unit 180 from going to sleep. For example, suppose that it takes about 100 microseconds for the PLL circuit of the frequency synthesizer 113 to start up and reach a steady operation state. In that case, if the length of sleep is about the same as that start-up time, the sleep state offers no advantage. If some margins are added so as to give a start-up time of 150 microseconds, the time corresponds to 207 bytes at 11 megabits (Mbits) per second. A byte length less than that byte count may not be in compliance with the start-up from sleep. In this case, the sleep state is allowed to occur only if the MAC frame in use has a capacity of at least 237 bytes, 30 bytes more than the 207 bytes above.

Typical structures of frames and their handling in conjunction with this embodiment will now be described with reference to the relevant drawings.

Figure 4:
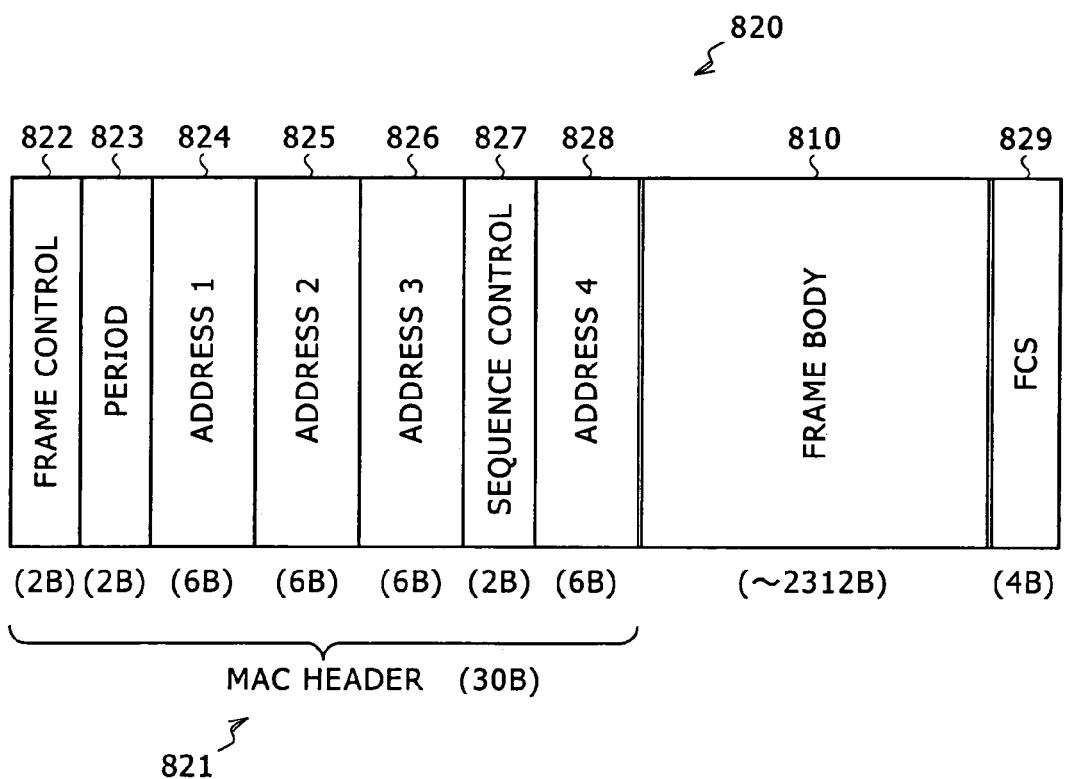
FIG. 4 is a schematic view showing a structure of a MAC frame 820 under the IEEE 802.11 standard.

FIG. 4 is a schematic view showing a structure of a MAC frame 820 under the IEEE 802.11 standard. The MAC frame 820, designed to propagate information under the MAC sublayer, includes a MAC header 821, a frame body 810, and a frame check sequence (FCS) 829. The MAC header 821 is formed by a frame control field 822, a period field 823, an address 1 field (824), an address 2 field (825), an address 3 field (826), a sequence control field 827, and an address 4 field (828).

The frame control field 822 is a field that indicates frame control information including a frame type and a communication mode. The period field 823 is a field that indicates a reserved time in effect until transmission of the frame in question is completed. The sequence control field 827 is a field indicating a fragment number and a sequence number in effect upon fragmentation.

The address 1 field through address 4 field (824 to 826 and 828) are fields that indicate a frame source address, a destination address and others. What these four addresses signify varies with the communication mode designated in the frame control field 822. Illustratively, for communication from the access point 200 to the wireless terminal 100 in the setup of FIG. 1, the address 1 field (824) stands for the destination address and the address 3 field (826) for the source address.

In the MAC header 821, as shown in FIG. 4, the frame control field 822, period field 823, and sequence control field 827 each have a capacity of 2 bytes, while the address 1 field through address 4 field (824 to 826 and 828) have a capacity of 6 bytes each. That means the MAC header 821 as a whole has a total capacity of 30 bytes.

The frame body 810 corresponds to a payload in the MAC frame 820 and is used to transmit data under the MAC sublayer. The frame body 810 has a maximum capacity of 2,312 bytes. The FCS field 829 is used to detect an error in the MAC frame 820. Specifically, the FCS field 829 carries a one's complement of the remainder calculated from a generating polynomial. The FCS field 829 has a capacity of 4 bytes. Thus the MAC frame 820 as a whole has a maximum capacity of 2,346 bytes.

Figure 5:
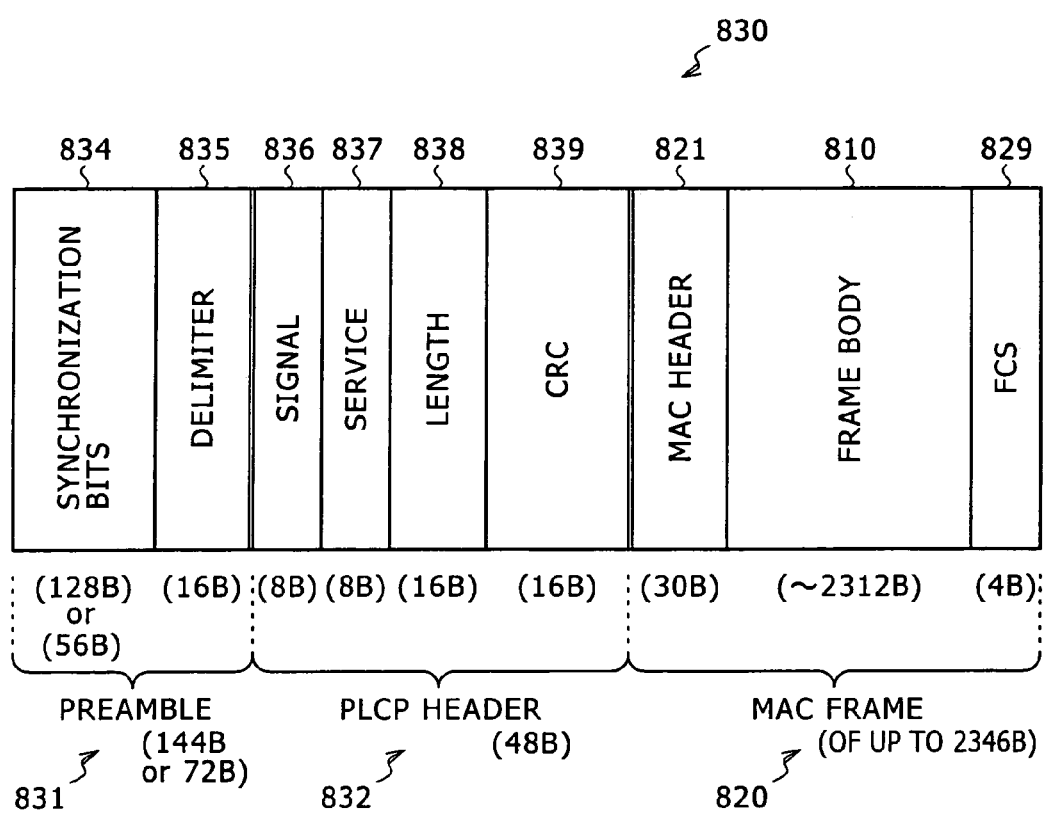
FIG. 5 is a schematic view showing a structure of a PLCP frame 830 under the IEEE 802.11b standard.

FIG. 5 is a schematic view showing a structure of a PLCP frame 830 under the IEEE 802.11b standard. The PLCP frame 830, designed to propagate information under the PLCP sublayer, includes a preamble 831 and a PLCP header 832 and has the MAC frame 820 as a payload.

The preamble 831 is a synchronizing signal that includes a synchronization bit field 834 and a delimiter 835. The IEEE 802.11b standard stipulates two formats: a long format for maintaining compatibility with the direct-sequence spread-spectrum system under the IEEE 802.11 standard, and a short format for high-speed performance. The synchronization bit field 834 is 128 bits long in the long format and 56 bits long in the short format. In either format, the delimiter 835 has 16 bits. That means the preamble as a whole has 144 bits or 72 bits.

The PLCP header 832 includes a signal field 836, a service field 837, a length field 838, and CRC (cyclic redundancy check) field 839. The signal field 836 is a field that indicates a transmission rate. The service field 837 is a field that typically indicates a modulation method. The length field 838 is a field that gives the length of the MAC frame 820 in microseconds. The CRC field 839 is a field for use in detecting an error of the PLCP header 832.

In the PLCP header 832, the signal field 836 and service field 837 each are 8 bits long, while the length field 838 and CRC field 839 are 16 bits long each. Thus the PLCP header 832 as a whole has 48 bits.

The time required to transfer the PLCP frame 830 is calculated as follows: in the long format, the preamble 831 and PLCP header 832 are each transferred at 1 Mbit per second. Thus it takes 192 microseconds (=192 bits/($1\times10^6$ bits/second)) to transfer the PLCP frame 830 in the long format. In the short format, the preamble 831 is transferred at 1 Mbit per second and the PLCP header 832 at 2 Mbits per second. That means it takes 96 microseconds (=72 bits/($1\times 10^6$ bits/second)+48 bits/($2\times10^6$ bits/second)=72 microseconds+24 microseconds) to transfer the PLCP frame 830 in the short format. The time required to transfer the MAC frame 820 is dependent on the capacity of the frame body 810 as well as on the transmission rate designated in the signal field 836.

FIG. 6 is a tabular view showing how values of the signal field 836 are related to values of a transmission rate field 8361 under the IEEE 802.11b standard. The signal field 836 defines the transmission rate of the MAC frame 820. It follows that the transmission rate 8361 is obtained by referencing the signal field 836 in the PLCP header 832 under the IEEE 802.11b standard. In FIG. 6, the notation "0x~" is hexadecimal and the notation "0b~" is decimal. In the signal field 836, the hexadecimal notation "0A" stands for a transmission rate of 1 Mbit/second, "14" for 2 Mbits/second, "37" for 5.5 Mbits/second, and "6E" for 11 Mbits/second.

Normally, the signal field 836 does not have any other value than these four above. Any undefined value detected in the signal field 836 is interpreted as an error. The interpretation is carried out by the PLCP determination unit 442 (FIG. 3).

Figure 7:
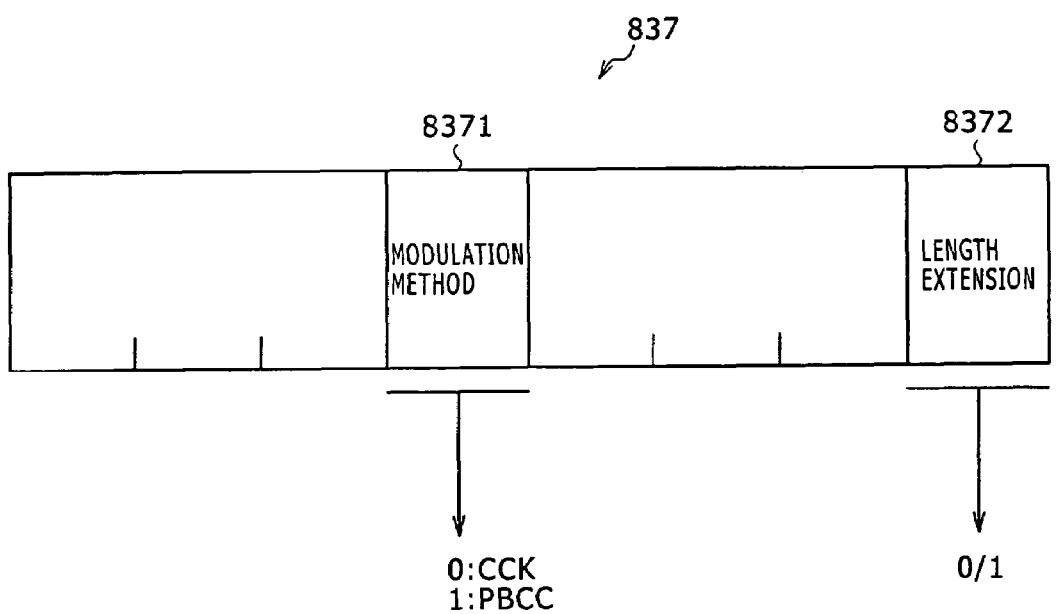
FIG. 7 is a schematic view showing specific values of a service field 837 under the IEEE 802.11b standard.

FIG. 7 is a schematic view showing specific values of the service field 837 under the IEEE 802.11b standard. The service field 837 is an eight-bit field in which the fourth-highest bit designates a modulation method 8371 and the least-significant bit defines length extension 8372.

A "0" in the modulation method bit 8371 indicates CCK and a "1" denotes PBCC (packet binary convolutional coding). Designation of these modulation methods is effective when the extended transmission rate of 5.5 Mbits/second or 11 Mbits/second is in effect under the IEEE 802.11b standard. In order to maintain compatibility with the IEEE 802.11 standard, DBPSK (differential binary phase shift keying) is adopted when the transmission rate of 1 Mbit/second is in effect and DQPSK (differential quadruple phase shift keying) is used when the transmission rate of 2 Mbits/second is in effect.

The length extension 8372 is a value that complements the field 838. When the transmission rate of 11 Mbits/second is in effect, the length extension 8372 is used to effect conversion between the length 838 in time (i.e., in microseconds) on the one hand and the byte count of the MAC frame 820 on the other hand. Specific ways to calculate the length extension will be discussed later.

Figure 8:
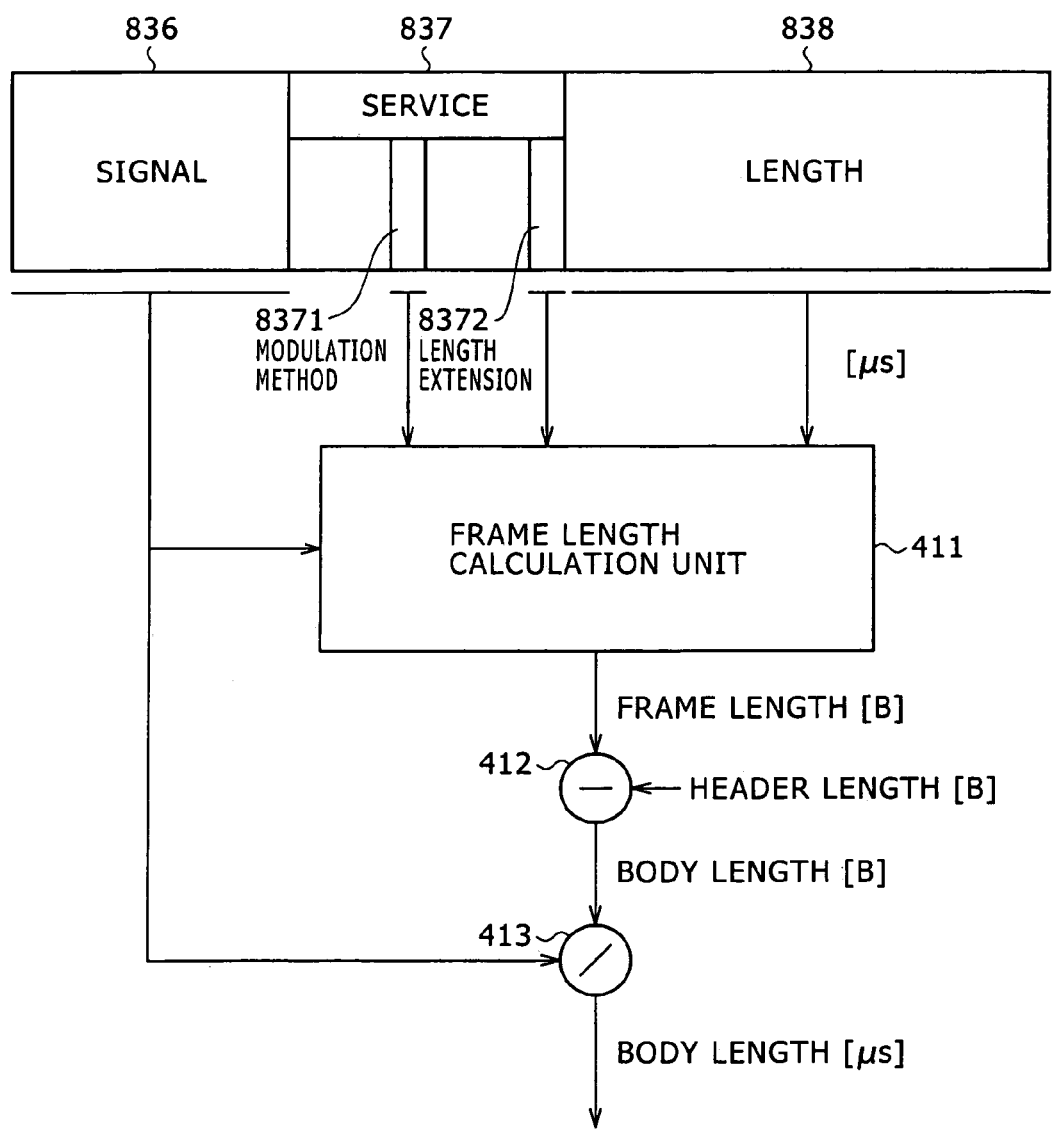
FIG. 8 is a schematic view showing how a sleep length calculation unit 410 embodying this invention complies with the IEEE 802.11b standard.

FIG. 8 is a schematic view showing how the sleep length calculation unit 410 embodying this invention complies with the IEEE 802.11b standard. The sleep length calculation unit 410 has a frame length calculation unit 411 that calculates the capacity of the MAC frame 820, a subtractor 412 that subtracts the capacity of the MAC header 821 from that of the MAC frame 820, and a divider 413 that performs divisions using the value of the transmission rate field 8361.

Under the IEEE 802.11b standard, the length field 838 of the PLCP header 832 indicates a length in microseconds. To calculate the length of sleep requires removing the length of the MAC header 821 in advance. The length of the MAC header 821 is given in 30 bytes constituting the capacity. That means the two different units need to be harmonized before the length of the MAC header 821 is subtracted. Whereas the length field 838 is converted to bytes in the example of FIG. 8, the length of the MAC header 821 may alternatively be converted into a time period.

The frame length calculation unit 411 converts the length 838 from microseconds into bytes using the transmission rate 8361 in the signal field 836 and the modulation method 8371 and length extension 8372 in the service field 837. The calculations involved are shown below.

When the transmission rate 8361 is 5.5 Mbits/second and the modulation method 8371 is CCK:

frame length (in bytes)=length 838 (in microseconds)×5.5/8 (fractions rounded off).

When the transmission rate 8361 is 11 Mbits/second and the modulation method 8371 is CCK:

frame length (in bytes)=(length 838 (in microseconds)×11/8)−length extension 8372 (fractions rounded off).

When the transmission rate 8361 is 5.5 Mbits/second and the modulation method 8371 is PBCC:

frame length (in bytes)=(length 838 (in microseconds)×5.5/8)−1(fractions rounded off).

When the transmission rate 8361 is 11 Mbits/second and the modulation method 8371 is PBCC:

frame length (in bytes)=(length 838 (in microseconds)×11/8)−length extension 8372 (fractions rounded off).

The subtractor 412 subtracts 30 bytes from the frame lengths in bytes obtained in the manner described above. This provides the length of the body (i.e., frame body 810 and FCS 829) that is equivalent to the MAC frame 820 minus the MAC header 821. The divider 413 divides the body length by the transmission rate 8361 in the signal field 836, thus giving the time required to transfer the body.

For example, suppose that the transmission rate 8361 is 11 Mbits/second, that the modulation method 8371 is CCK, that the length 838 is 744, and that the length extension 8372 is 0. In that case, the frame length is given as 744×11/8−0=1,023 (bytes)

Then the body length is given as $(1,023-30) \times 8/(11 \times 10^6) = 722$ (microseconds).

This body length may be used as the length of sleep. Preferably, as will be discussed later, the body length may be supplemented by a maximum inter frame space (DIFS) If the maximum inter frame space is assumed to be 128 microseconds, the sleep length is given as 722 (microseconds)+128 (microseconds)=850 (microseconds).

Figure 9:
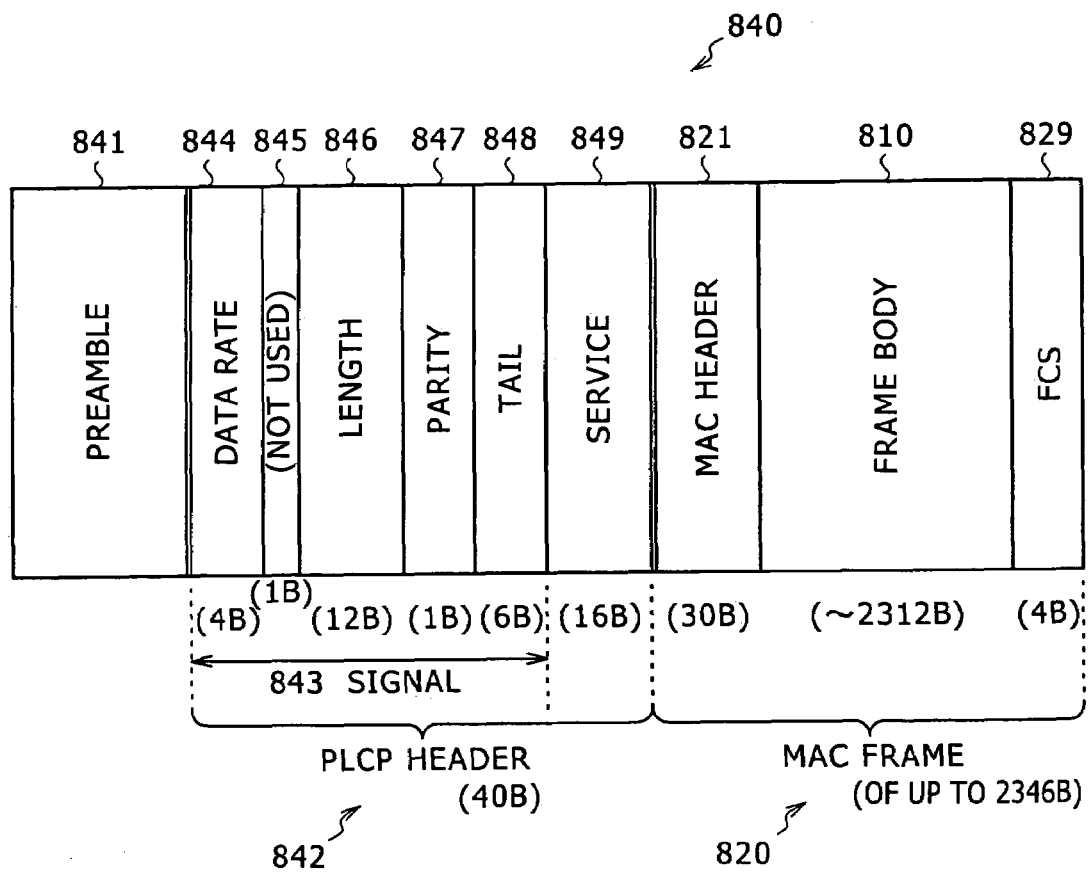
FIG. 9 is a schematic view showing a structure of a PLCP frame 840 under the IEEE 802.11a standard.

FIG. 9 is a schematic view showing a structure of the PLCP frame 840 under the IEEE 802.11a standard. As with the PLCP frame 830, the PLCP frame 840 is used to propagate information under the PLCP sublayer. The PLCP frame 840 has a preamble 841 and a PLCP header 842, and includes a MAC frame 820 as a payload. The IEEE 802.11a standard stipulates the use of 5 GHz band frequencies, as opposed to 2.4 GHz band frequencies under the IEEE 802.11 standard. There is no compatibility between the two frequency bands under the two standards, with a different frame format adopted by each of the two standards.

The preamble 841 is a synchronizing signal that has a length of 12 symbols. A symbol is the unit of modulation used by OFDM under the IEEE 802.11a standard. Under the OFDM scheme, a plurality of subcarriers orthogonal to one another are used simultaneously to transmit signals in parallel. When used in combination with an error correcting code system, the multiple subcarriers reproduce data correctly even if some carrier is not received due to obstructions or interference.

A PLCP header 842 has a data rate field 844, a length field 846, a parity field 847, a tail field 848, and a service field 849. The data rate field 844 is a self-explanatory field indicating a data rate. The length field 846 is a field that indicates the length of the MAC frame 820 in bytes. The parity field 847 contains a code for error detection. The tail field 848 is a field that represents the tail of a signal field 843 starting from the data rate field 844.

In the signal field 843, the data rate field 844 is 4 bits long, the length field 846 is 12 bits long, the parity field 847 is 1 bit long, and the tail field 848 is 6 bits long. An unused bit field 845 that is 1 bit long is interposed between the data rate field 844 and the length field 846. That means the signal field 843 uses a total of 24 bits. The six bits constituting the tail field 848 are all set to zeros.

The service field 849 is a 16-bit field in which the high-order 7 bits are used to synchronize with a descrambler of the receiving terminal and the low-order 9 bits are reserved for future use. The 16 bits constituting the service field 849 are all set to zeros.

FIG. 10 is a tabular view showing specific values of the data rate field 844 under the IEEE 802.11a standard. Each of the values in the data rate field 844 is corresponds in predetermined fashion with a modulation method 8441, a coding rate 8442, and a transmission rate 8443. It follows that the transmission rate 8443 is obtained by referencing the data rate field 844 in the PLCP header 842 under the IEEE 802.11a standard.

Normally, the data rate field 844 does not have any other value than those listed in FIG. 10. Any undefined value detected in the data rate field 844 is interpreted as an error. The interpretation is carried out by the PLCP determination unit 442 (FIG. 3).

Figure 11:
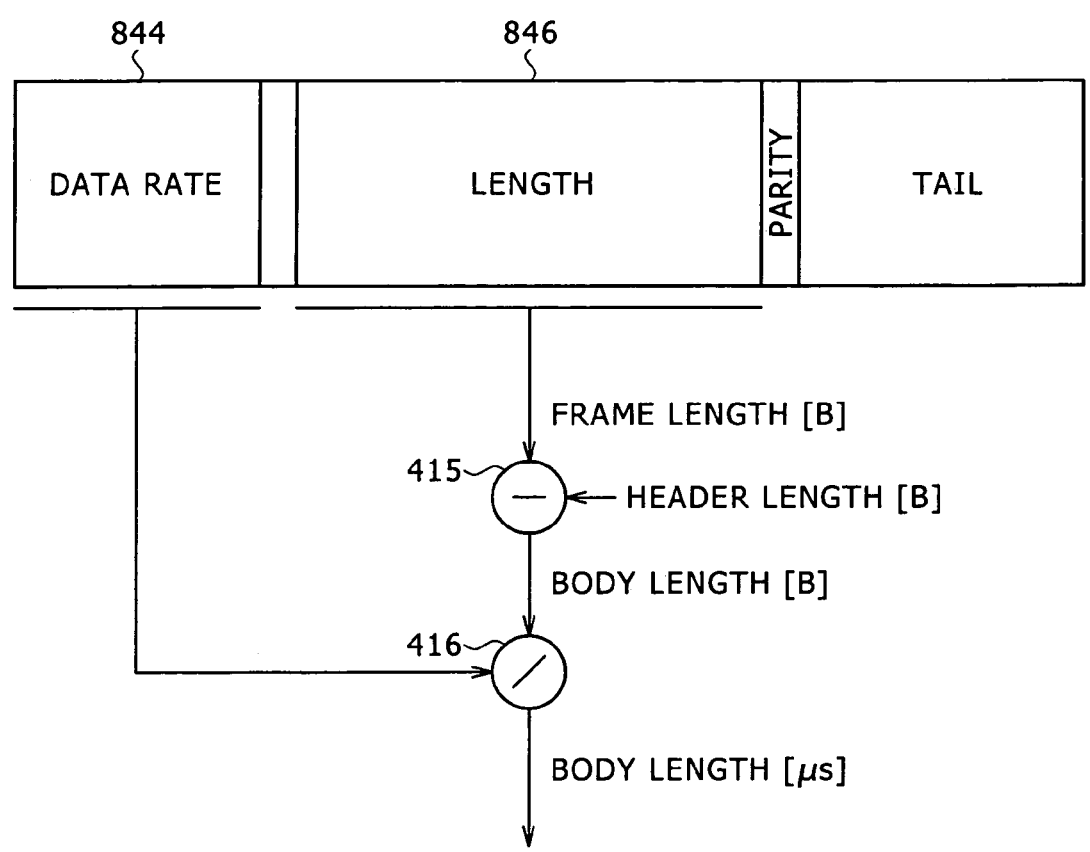
FIG. 11 is a schematic view showing how the sleep length calculation unit 410 embodying this invention complies with the IEEE 802.11a standard.

FIG. 11 is a schematic view showing how the sleep length calculation unit 410 embodying this invention complies with the IEEE 802.11a standard. The sleep length calculation unit 410 includes a subtractor 415 that subtracts the capacity of the MAC header 821 from that of the MAC frame 820, and a divider 416 that performs divisions using the value of the transmission rate field 8443.

Under the IEEE 802.11a standard, the length field 846 of the PLCP header 842 indicates a length in terms of bytes constituting a capacity. Unlike the IEEE 802.11b standard, the IEEE 802.11a standard thus permits acquisition of a body length without the conversion from time period to capacity. Specifically, the subtractor 412 obtains the body length by subtracting 30 bytes of the MAC header 821 from the length 846. The divider 416 divides the body length by the transmission rate 8443 in the data rate field 844, thus providing the time required to transfer the body.

Suppose that the data rate 844 is "0b1011" and that the length 846 is 1,030. In that case, the body length is given as $(1{,}030-30) \times 8 / (36 \times 10^6) = 222$ (microseconds).

This body length may be used as the length of sleep. Preferably, as discussed above in connection with the IEEE 802.11b standard, the body length may be supplemented by the maximum inter frame space.

How sleep operations are timed to occur with this embodiment will now be described by referring to the relevant drawings.

FIGS. 12A and 12B are timing charts showing how transmission sequences are related to the transmitting and receiving operations of wireless terminals in a wireless communication system. FIG. 12A indicates typical transmission sequences of communication between an access point A on the one hand and terminals B and C on the other hand. FIG. 12B shows how the terminal C transmits and receives data during the transmission sequences.

When the access point A firs transmits a data frame 11 to the terminal C, the terminal C receives the data frame 11 in a receiving operation 31. Because the destination of the data frame 11 is the terminal C, the terminal C receives the entire data frame 11. Following the reception of the data frame 11, the terminal C transmits an ACK frame 32 to the access point A acknowledging the receipt of the data frame.

The access point A then transmits a data frame 13 to the terminal B. At this point, the terminal C initiates a receiving operation 331 and starts receiving a PLCP frame 830. Upon receipt of the MAC header 821, the terminal C determines where the frame is destined. When the data frame 13 is found destined for the terminal B, the terminal C effects a transition into a sleep operation 332. Upon receipt of the data frame 13, the terminal B transmits an ACK frame 24 to the access point A.

When the terminal B transmits a data frame 25 to the access point A, the terminal C also initiates a receiving operation 351. Upon receipt of the MAC header 821, the terminal C determines that the data frame 25 is destined for the access point A. At that point, the terminal C initiates a sleep operation 352.

In the examples of FIGS. 12A and 12B, the body length is used as the sleep length. Sleep mode is selected immediately after reception of the MAC header 821 and the mode is maintained until transmission of the FCS 829 is completed. However, this is not the only way the sleep operation is timed to end. Alternatively, a longer time period may be used as the sleep length.

Figure 13:
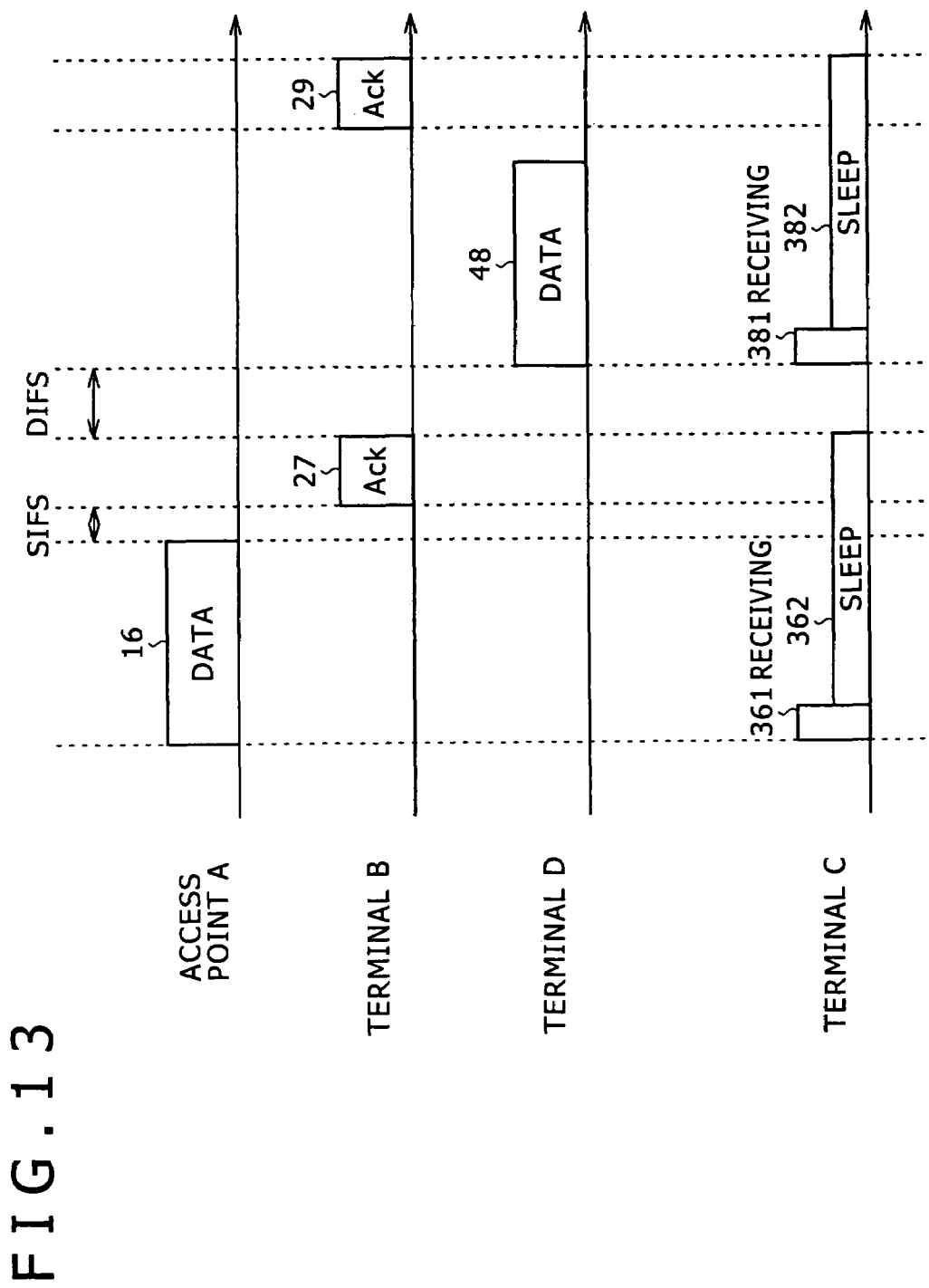
FIG. 13 is a timing chart showing how sleep operations are timed to end.

FIG. 13 is a timing chart showing how sleep operations are timed to end. Under the IEEE 802.11 standard, inter frame spaces (IFS) are stipulated as the basis for determining whether the medium about to be accessed is idle. If no signal is detected from the medium longer than a predetermined time period, that medium is deemed to be in an idle state. A plurality of inter frame spaces are defined under the standard. A minimum inter frame space (SIFS) is defined as the timing for a terminal transmitting an ACK frame upon normal receipt of a data frame. A maximum inter frame space (DIFS) is defined as the timing for a terminal transmitting a data frame following the transmission of an ACK frame.

In the example of FIG. 13, the access point A transmits a data frame 16 to the terminal B. After entering a receiving operation 361, the terminal C initiates a sleep operation 362 upon receipt of a MAC header 821. In this case, the sleep length is obtained by adding up the body length, the minimum inter frame space, and the ACK packet length. With the sleep length established in the above manner, there is no problem if the next data frame 48 is transmitted regularly as shown in FIG. 13. This causes the terminal C to enter another receiving operation 381 before initiating a sleep operation. However, if the terminal B fails to receive the data frame 16 normally, the terminal B will not transmit an ACK frame 27. This can lead to problems as described below.

Figure 14:
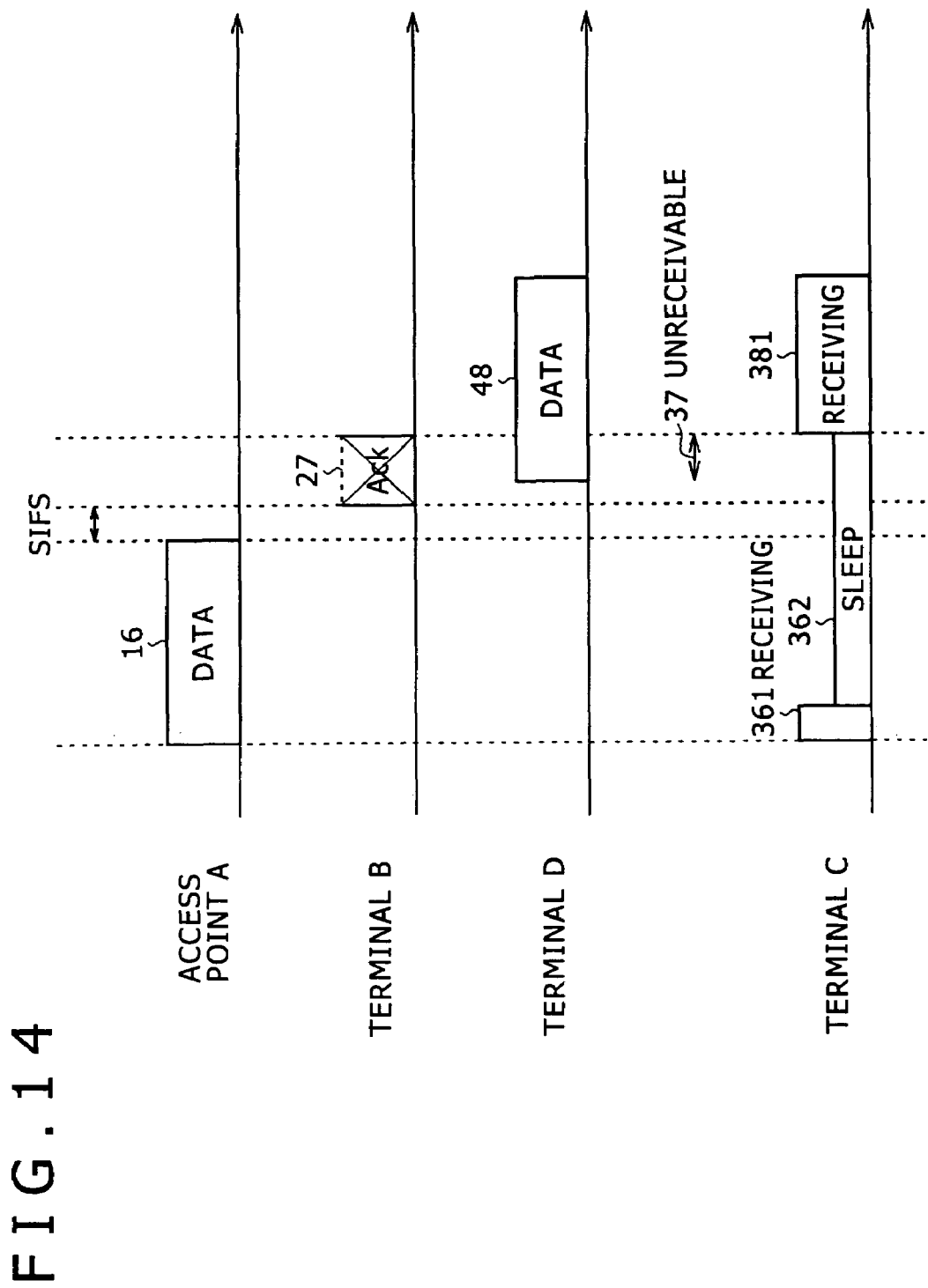
FIG. 14 is a timing chart showing the timing of the data frame in FIG. 13 not being received normally.

FIG. 14 is a timing chart showing the timing of the data frame in FIG. 13 not being received normally. Ordinarily, the data frame 16 sent by the access point A would be received normally by the terminal B which in turn would transmit an ACK frame 27 to the access point A. This should prevent any other terminal than the terminal B from transmitting a data frame at the same time as the ACK frame 27.

However, if the terminal B fails to receive the data frame 16 normally, the terminal B does not transmit an ACK frame 27. This could let a terminal other than the terminal B transmit a data frame upon elapse of the maximum inter frame space following the data frame 16. In the example of FIG. 14, a terminal D transmits a data frame 48. The terminal C, in a sleep state until the end of the ACK frame 27, cannot receive the data frame 48 from the terminal D, leaving an unreceivable period 37 to take place. The subsequent attempt by the terminal C to receive the data frame 48 in a receiving operation 381 thus results in a failure.

Figure 15:
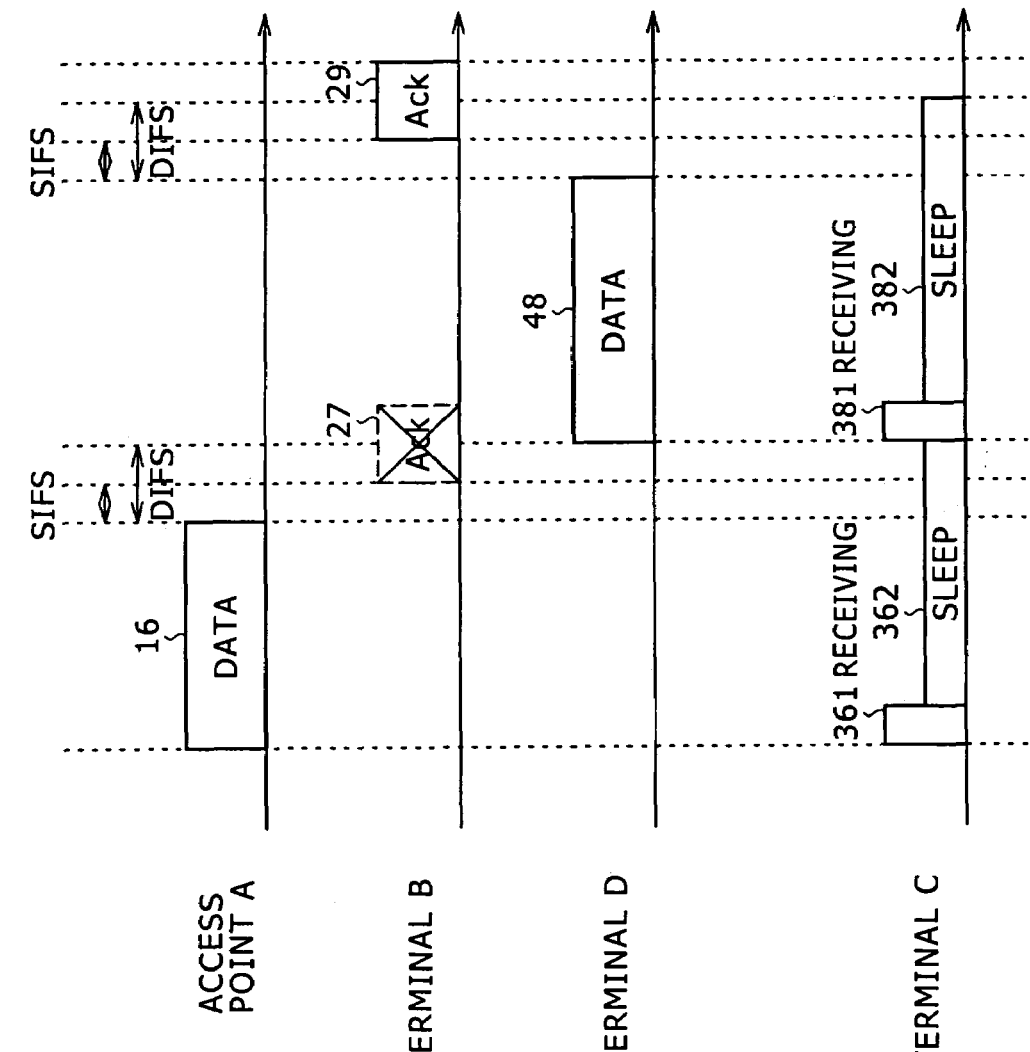
FIG. 15 is another timing chart showing how sleep operations are timed to end.

FIG. 15 is another timing chart showing how sleep operations are timed to end. In this example, the length of the sleep operation 362 during transmission of the data frame 16 by the access point A is obtained by adding the maximum inter frame space to the body length. Given this timing, if the terminal B did not send the ACK frame 27 because of the failure to receive the data frame 16 normally and if the terminal D transmits the data frame 48 upon elapse of the maximum inter frame space following the transmission of the data frame 16, the terminal C can still initiate the receiving operation 381 successfully.

The body length may thus be used unchanged as the sleep length. More preferably, the body length may be supplemented by the maximum inter frame space when utilized as the sleep length. It is also possible to establish the sleep length by adding the minimum inter frame space and ACK packet length to the body length. This, however, could result in the unreceivable period 37 taking place. Still, the emergence of the unreceivable period 37 does not prevent any frame destined for this terminal from getting retransmitted even if that frame has not been received. There is no conflict in the process; it is only efficiency that is somewhat lowered.

How the wireless terminal 100 according to this invention works will now be described with reference to the relevant drawings.

Figure 16:
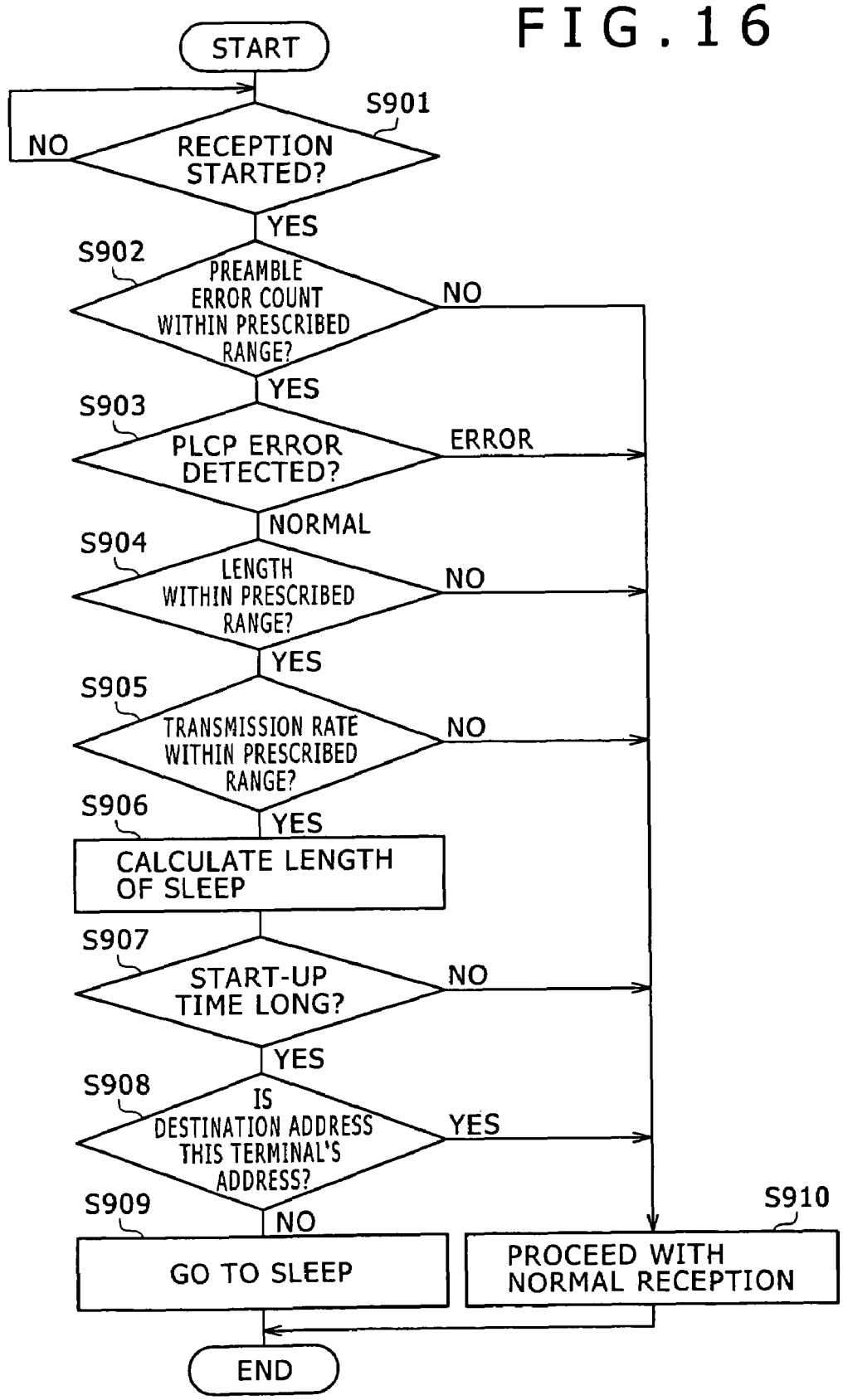
FIG. 16 is a flowchart of steps in which the wireless terminal 100 embodying this invention typically operates.

FIG. 16 is a flowchart of steps in which the wireless terminal 100 embodying this invention typically operates. In step S901, the wireless terminal 100 starts receiving a PLCP frame 830 (840). The preamble checking unit 132 checks for errors in the preamble 831 (841). If in step S902 the preamble determination unit 441 determines that the number of detected errors has exceeded a predetermined threshold count, that indicates the possibility of a worsened quality of the transmission channel in use. In that case, step S910 is reached and the power supply unit 180 is instructed to inhibit a sleep state and proceed with a normal receiving operation.

If in step S902 the number of detected data errors is found below the prescribed threshold count, the PLCP header processing unit 133 proceeds to check for an error in the PLCP header 832 (842). If in step S903 the PLCP determination unit 442 determines that a prescribed error has been detected, that suggests a possible error of information in the PLCP header 832 (842). In that case, step S910 is reached and the power supply unit 180 is instructed to inhibit a sleep state and proceed with a normal receiving operation.

If in step S903 the prescribed error is not detected, the PLCP determination unit 442 proceeds to determine whether the length field 846 (838) in the PLCP header 842 (832) has a prescribed value. That is, since the maximum length of the MAC frame 820 is 2,346 bytes, any value in the length field 846 exceeding that threshold value constitutes an error. If in step S904 the PLCP determination unit 442 determines that the length field 846 contains any value outside the prescribed range, that suggests a possible error of information in the PLCP header 842 (832). In that case, step S910 is also reached and the power supply unit 180 is instructed to inhibit a sleep state and proceed with a normal receiving operation.

If in step S904 the length field 846 (838) is not found to have a value outside the prescribed range, the PLCP determination unit 442 proceeds to determine whether the transmission rate of the PLCP header 832 (842), i.e., the value in the signal field 836 (data rate 844), is one of the values defined in advance. If in step S905 the PLCP determination unit 442 determines that an undefined value is contained in the signal field 836, that suggests a possible error of information in the PLCP header 832 (842). In that case, step S910 is also reached and the power supply unit 180 is instructed to inhibit a sleep state and proceed with a normal receiving operation.

If in step S905 the transmission rate is found to be an undefined value, then step S906 is reached and the sleep length calculation unit 410 calculates a sleep length. The calculated sleep length is set on the time 430.

The sleep length calculated in step S906 is compared by the start-up time determination unit 443 with the start-up times of the components in the wireless terminal 100. If in step S907 the sleep length is not found to be longer than each of these start-up times, that means the sleep operation will not be effective. In that case, step S910 is also reached and the power supply unit 180 is instructed to inhibit a sleep state and proceed with a normal receiving operation.

If in step S907 the sleep length is found longer than any of the start-up times, the address detection unit 420 proceeds to check the destination address. If in step S908 the destination address is found different from the address of this terminal, there is no need to receive any more data. In that case, step S909 is reached and the power supply unit 180 is instructed to go into a sleep state. At the same time, the timer 430 is instructed to start counting time on the sleep length. Upon elapse of the sleep length, the timer 430 instructs the power supply unit 180 to stop the sleep operation. If in step S908 the destination address is found the same as the address of this terminal, then step S910 is reached and a normal receiving operation is carried out.

Explained below is an example in which a specific improvement was observed through the use of the embodiment of this invention. According to the invention, a check is made to determine whether or not to go into the sleep sate following the data reception starting from the preamble 831 (841) at the top of the PLCP frame 830 (840) and ending with the MAC header 821. That is, the normal receiving state continues until the reception of the MAC header 821 is completed.

Illustratively, where the short format under the IEEE 802.11b standard is in use, it takes 96 microseconds to receive the preamble 831 and PLCP header 832 in the manner described above. If the transmission rate is 11 Mbits/second, then receiving the MAC header 821 requires:

$(30 \times 8 \text{ bits})/(11 \times 10^6 \text{ bits/second}) \approx 22 \text{ microseconds}$ Thus with the short format in use, a receiving operation takes place for a period of:

$96+22=118$ microseconds before the sleep state is entered. If the sleep length is assumed to be 2,316 bytes at the same transmission rate, a sleep operation takes place for a period of:

$(2,316 \times 8 \text{ bits})/(11 \times 10^6 \text{ bits/second}) \approx 1,684$ microseconds This sleep length is dependent on the length of the frame body 810. In obtaining the sleep length, it is also possible to supplement the frame body by the maximum inter frame space as discussed above.

Most frequently, power consumption is estimated to be between 500 mW and 1 W in the receiving state and between 10 mW and 300 mW in the sleep state. Suppose that, in a hypothetical case, power consumption is 800 mW in the receiving state and 50 mW in the sleep state. In this example, the improvement in power consumption with the short format in use is given as:

$$(118 \times 800 + 1{,}684 \times 50)/((118 + 1{,}684) \times 800) \approx 0.124$$

That means a reduction in power dissipation of more than 80 percent can be achieved.

According to the invention, as described above, the sleep length calculation unit 410 in the power control unit 400 calculates the sleep length based on what is contained in the PLCP header 832 (842). The address detection unit 420 detects the destination address from the content of the MAC header 821. If the frame is found destined for another terminal, this terminal stops its receiving operation and enters a sleep state. In particular, the PLCP header 832 (842) contains the CRC 839 (parity 847) under existing standards so that the sleep length can be calculated with an adequate margin of safety.

If the content of the PLCP 832 (842) or MAC header 821 is found unreliable or if the sleep state is deemed undesirable in view of the start-up times of the components involved, the sleep inhibit determination unit 440 inhibits transition into the sleep state. This feature allows the sleep operation to take place with a higher margin of safety than before.

While the invention has been described in conjunction with specific embodiments claimed correspondingly in the appended claims as will be outlined below, these embodiments should not be construed as limiting the scope of the invention but as merely providing illustrations of some of the presently preferred embodiments of this invention. It is to be understood that changes and variations may be made without departing from the spirit or scope of the claims that follow.

In the foregoing description, the sleep length calculation unit 410 in the power control unit 400 was shown to calculate the length of sleep. Alternatively, the processor 140 may calculate the sleep length.

The steps and processes discussed in the foregoing description may be considered to constitute a method made up of these steps and processes, a program for causing a computer to execute that method, or a storage medium for retaining that program.

INDUSTRIAL APPLICABILITY

As described above, the wireless communication system according to the invention is arranged to acquire necessary information and effect a transition to a power-saving state accordingly, without adding changes to existing standards.

The invention claimed is:

1. A terminal which receives a physical layer frame including an upper layer frame relative to an upper layer above a physical layer and which has power-saving mode involving operations more energy-efficient than normal operations, comprising:

power-saving operation time calculating means for calculating a power-saving operation time in accordance with a length of said upper layer frame extracted from a header of said physical layer frame;

address detecting means which, after detecting a destination address from a header of said upper layer frame upon receipt thereof and determining that said upper layer frame is not destined for said terminal, gives an instruction for transition into said power-saving mode starting from the beginning of a body of said upper layer frame; and means which, upon elapse of said power-saving operation time calculated in response to said instruction for transition into said power-saving mode, gives an instruction to cancel said power-saving mode;

wherein said power-saving operation time calculating means calculates as said power-saving operation time a time which is longer than a first time corresponding to said length of said upper layer frame minus the length of said header of said upper layer frame and which is less than a second time corresponding to said first time supplemented with a maximum frame interval.

2. A terminal which receives a physical layer frame including an upper layer frame relative to an upper layer above a physical layer and which has power-saving mode involving operations more energy-efficient than normal operations, comprising:

power-saving operation time calculating means for calculating a power-saving operation time in accordance with a length of said upper layer frame extracted from a header of said physical layer frame;

address detecting means which, after detecting a destination address from a header of said upper layer frame upon receipt thereof and determining that said upper layer frame is not destined for said terminal, gives an instruction for transition into said power-saving mode starting from the beginning of a body of said upper layer frame; and means which, upon elapse of said power-saving operation time calculated in response to said instruction for transition into said power-saving mode, gives an instruction to cancel said power-saving mode;

wherein said power-saving operation time calculating means calculates as said power-saving operation time a time obtained by adding a maximum frame interval to said length of said upper layer frame minus the length of said header of said upper layer frame.

* * * * *